United States Patent
Mita et al.

[11] Patent Number: 6,035,381
[45] Date of Patent: Mar. 7, 2000

[54] MEMORY DEVICE INCLUDING MAIN MEMORY STORAGE AND DISTINCT KEY STORAGE ACCESSED USING ONLY A ROW ADDRESS

[75] Inventors: Kimiko Mita, Hadano; Atsushi Tanaka, Atsugi, both of Japan

[73] Assignee: Hitachi, Ltd., Tokyo, Japan

[21] Appl. No.: 08/764,253

[22] Filed: Dec. 12, 1996

[30] Foreign Application Priority Data

Dec. 14, 1995 [JP] Japan ................................. 7-325992

[51] Int. Cl.[7] ................................................. G06F 12/14
[52] U.S. Cl. ...................... 711/164; 714/766; 711/145; 711/163
[58] Field of Search ..................... 711/164, 163, 711/145, 5; 395/186, 188.01, 287; 371/40.11, 40.17, 40.4, 51.1, 53, 57.1, 67.1

[56] References Cited

U.S. PATENT DOCUMENTS

| | | | |
|---|---|---|---|
| 3,576,544 | 4/1971 | Cordero, Jr. et al. | 711/164 |
| 4,354,225 | 10/1982 | Frieder et al. | 711/5 |
| 4,441,152 | 4/1984 | Matsuura et al. | 709/251 |
| 4,472,790 | 9/1984 | Burk et al. | 711/164 |
| 4,514,847 | 4/1985 | Tateishi et al. | 714/805 |
| 4,589,064 | 5/1986 | Chiba et al. | 711/164 |
| 4,947,318 | 8/1990 | Mineo | 713/200 |
| 4,999,770 | 3/1991 | Ara et al. | 711/164 |
| 5,163,096 | 11/1992 | Clark et al. | 711/164 |
| 5,426,752 | 6/1995 | Takahasi et al. | 711/209 |
| 5,498,990 | 3/1996 | Leung et al. | 327/323 |

FOREIGN PATENT DOCUMENTS 63-206844 8/1988 Japan .

*Primary Examiner*—B. James Peikari
*Attorney, Agent, or Firm*—Beall Law Offices

[57] ABSTRACT

A data memory unit including a main memory data storage portion that is accessed by a row address and a column address representing all of the bits of a given address and a main memory key data storage portion that is accessed by just the row address which is fewer that all of the bits of the given address are integrated into a single semiconductor chip. A data storage apparatus is composed of a plurality of such data memory units. The main memory key data storage portion can be increased at the same time as when the capacity of the main memory is increased, thereby simplifying the process of increasing main memory size.

4 Claims, 6 Drawing Sheets

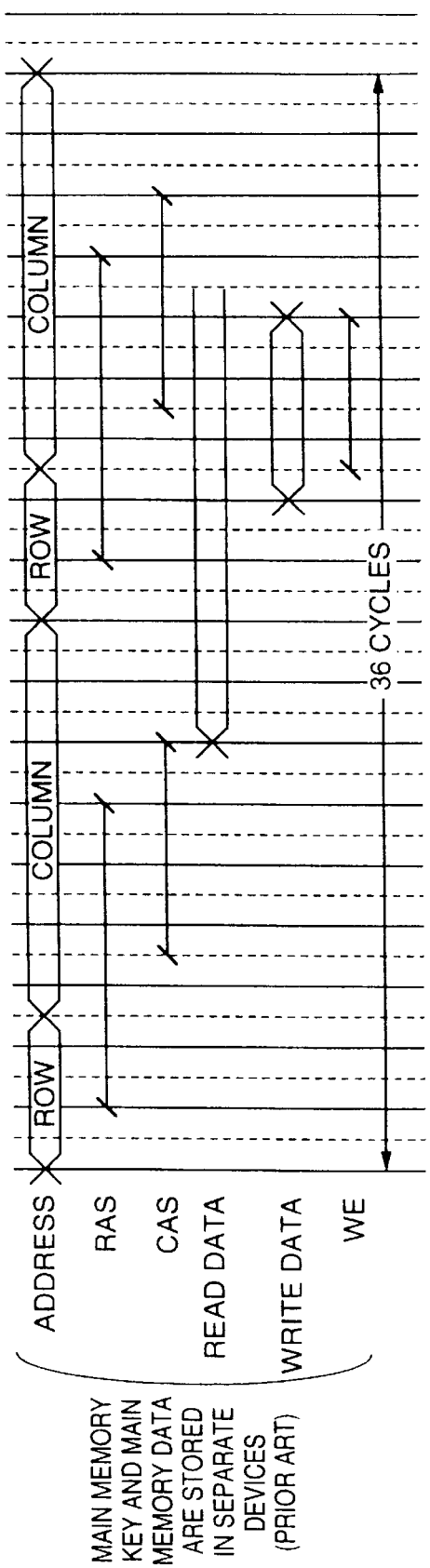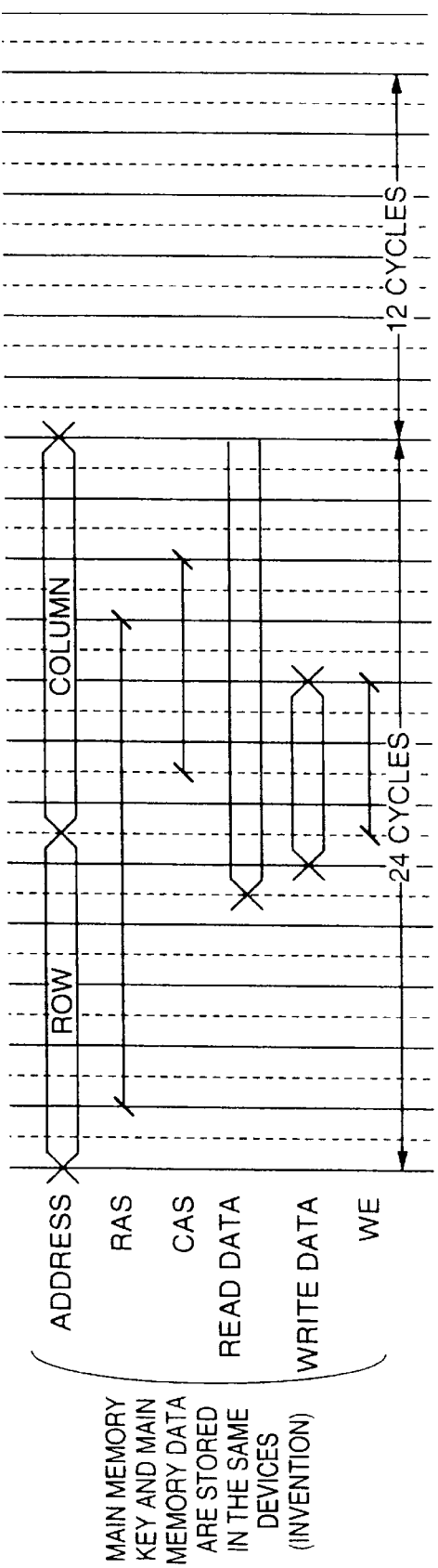

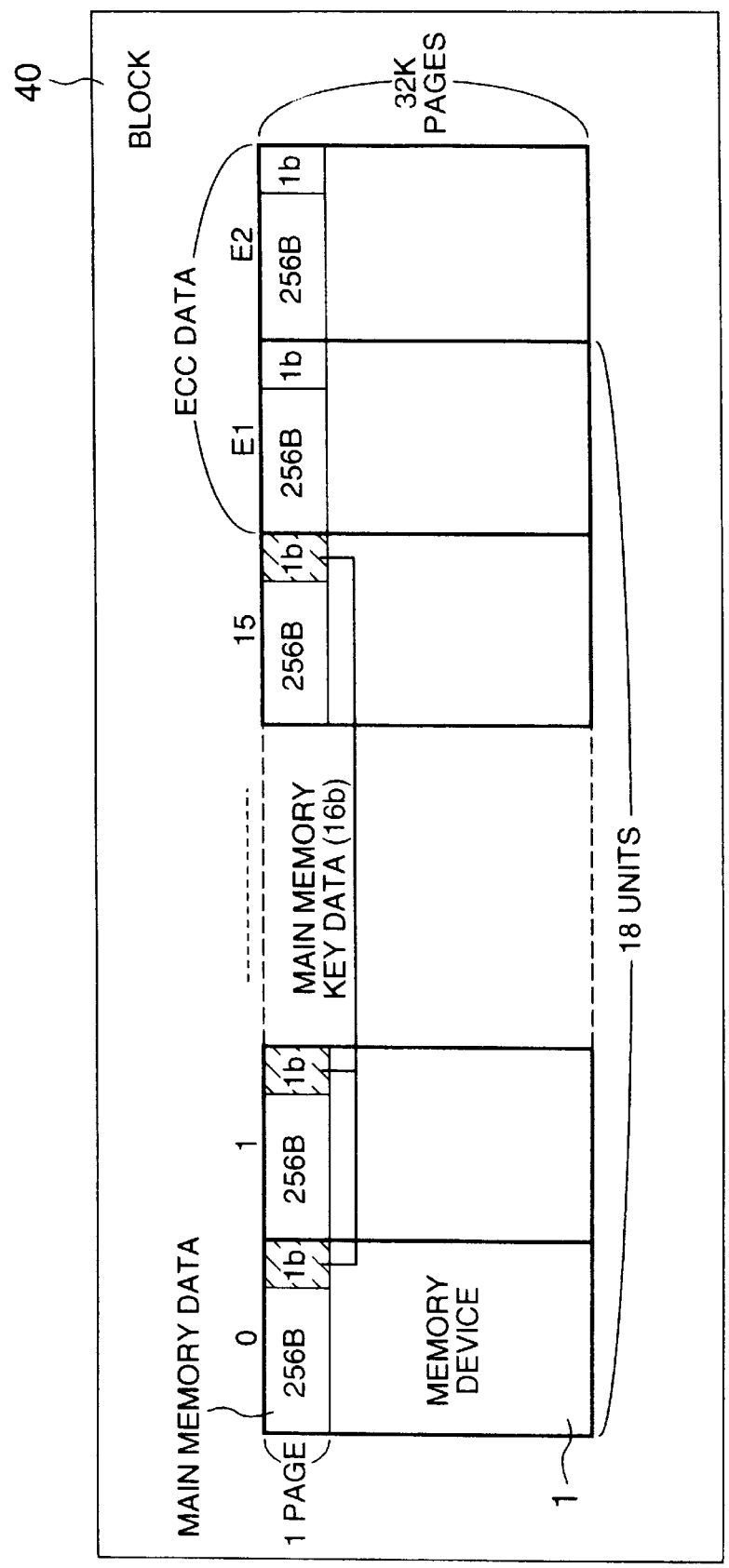

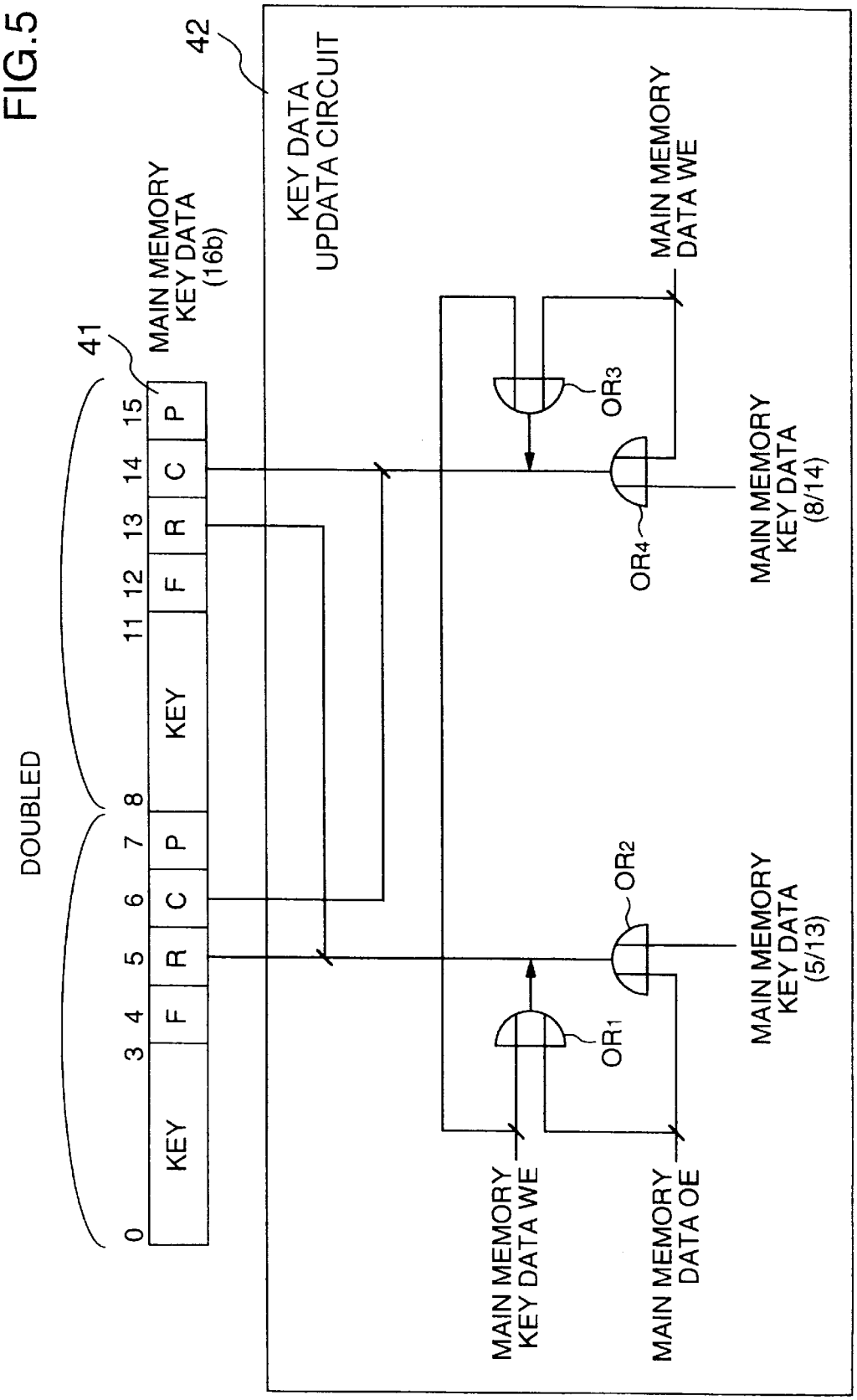

FIG.6
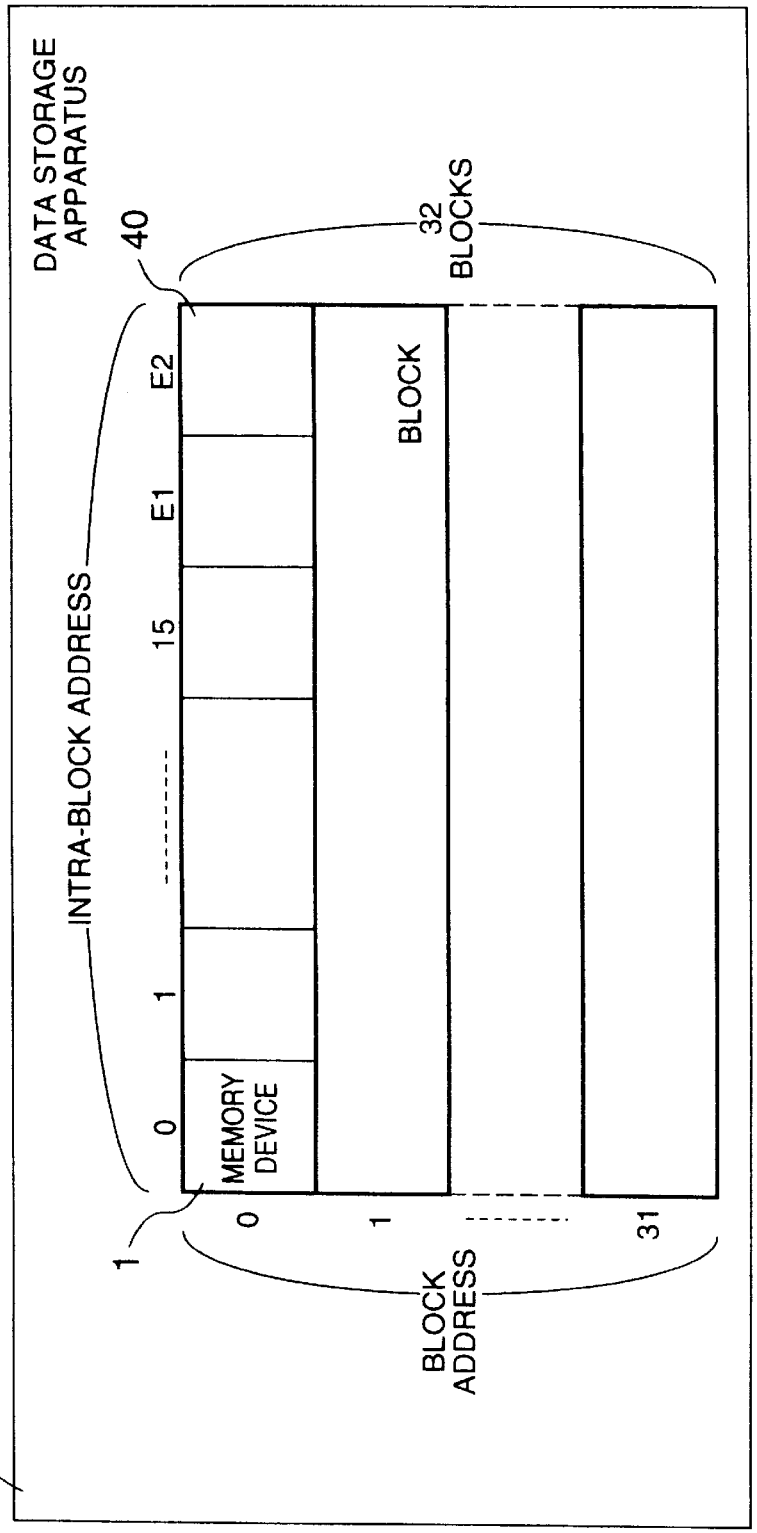
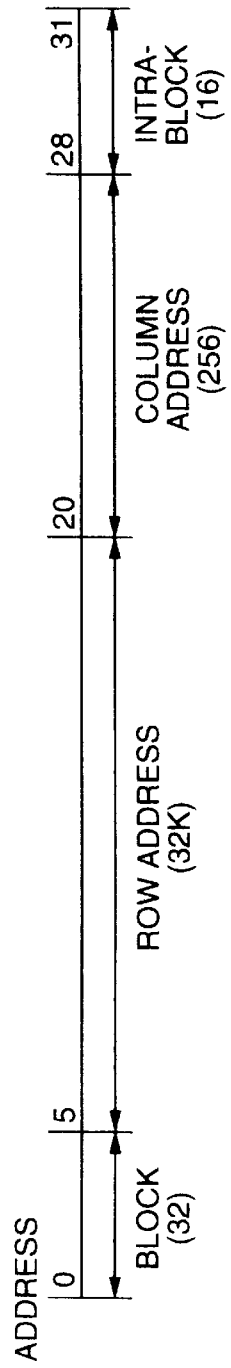

MEMORY DEVICE INCLUDING MAIN MEMORY STORAGE AND DISTINCT KEY STORAGE ACCESSED USING ONLY A ROW ADDRESS

BACKGROUND OF THE INVENTION

The present invention relates to a data memory unit and a data storage apparatus using the unit. More particularly, the present invention relates to a data memory unit and a data storage apparatus using the unit, wherein the unit is capable of easily making reference and update of reference data.

Generally, a memory unit such as conventional integrated SRAM and DRAM is configured to make reference to data by means of all bits of an address supplied to the memory unit. Further, a data storage apparatus in an information processing unit, or the like, composed of such memory units includes a main memory data and reference data each provided in each of a plurality of memory areas (hereinafter referred to as pages) provided by dividing the main memory by a certain address space unit and for storing reference data (hereinafter referred to as main memory key data) indicating access protection to each page and the record of reading from and writing to each page. In the data storage apparatus, the main memory data and the main memory key data are stored in separate memory units.

In the conventional data storage apparatus described above, the main memory data and the main memory key data are stored in separate memory units and accordingly when the capacity of the main memory is to be increased due to increased integration of the memory units constituting a main memory data storage portion, there is a problem that the main memory cannot be increased if the integration of the memory units constituting the main memory data storage portion is not changed. For an example, see the disclosure of JP-A-63-206844.

Further, in order to solve the above problem, even if the main memory data and the main memory key data are attempted to be stored in the same memory unit, this is difficult to do because of the structure of the address, the width of data and the like, which are required for the memory unit.

SUMMARY OF THE INVENTION

It is an object of the present invention to provide a data memory unit in which main memory data and main memory key data can be stored in the same unit. Further, it is another object of the present invention to provide a data storage apparatus using the data memory unit and in which reference to main memory key data can be made at a higher speed than reference to main memory data and reference to the main memory data and update of the main memory key data appendant thereto can be made at the same time.

In order to achieve one of the objects, according to an aspect of the present invention, the data memory unit for making reference to data designated by an address includes a data storage portion in which data referred to by all bits of a given address are stored and a key data storage portion in which key data referred to by partial bits of a given address are stored. Further, the address is constituted by a row address and a column address inputted successively at different timings and the key data is referred to by only the row address.

In order to achieve another object, the data storage apparatus according to an aspect of the present invention includes a plurality of data memory units as described above and the key data are information appendant to data stored in the data storage portion. The key data in the key data storage portion is updated at the same time as reference to the data storage portion.

When the present invention is applied to a main memory, attention is paid to the fact that an address for making reference to the key data is a part of an address for making reference to the main memory data, and the data memory unit is integrally constituted by the data storage portion referred by all bits of an given address and the key data storage portion referred by partial bits of the given address. The unit can thereby store the main memory data and the main memory key data into one memory unit without an increased number of address pins.

Other objects, features and advantages of the present invention will become apparent when reading the following detailed description of the embodiments in conjunction with the accompanying drawings.

BRIEF DESCRIPTION OF THE DRAWINGS

FIG. 3(a) is a timing chart showing operation of the data memory unit of the prior art;

FIG. 3(b) is a timing chart showing operation of the data memory unit of the present invention;

FIG. 4 is a block diagram schematically illustrating a memory block constituted by the memory units according to an embodiment of the present invention;

FIG. 5 is a block diagram schematically illustrating an example of a circuit for updating main memory key data; and FIG. 6 illustrates a configuration and allocation of an address of a data storage apparatus according to an embodiment of the present invention.

DESCRIPTION OF THE PREFERRED EMBODIMENTS

Embodiments of a data memory unit and a data storage apparatus according to the present invention will now be described with reference to the accompanying drawings.

Figure 1:
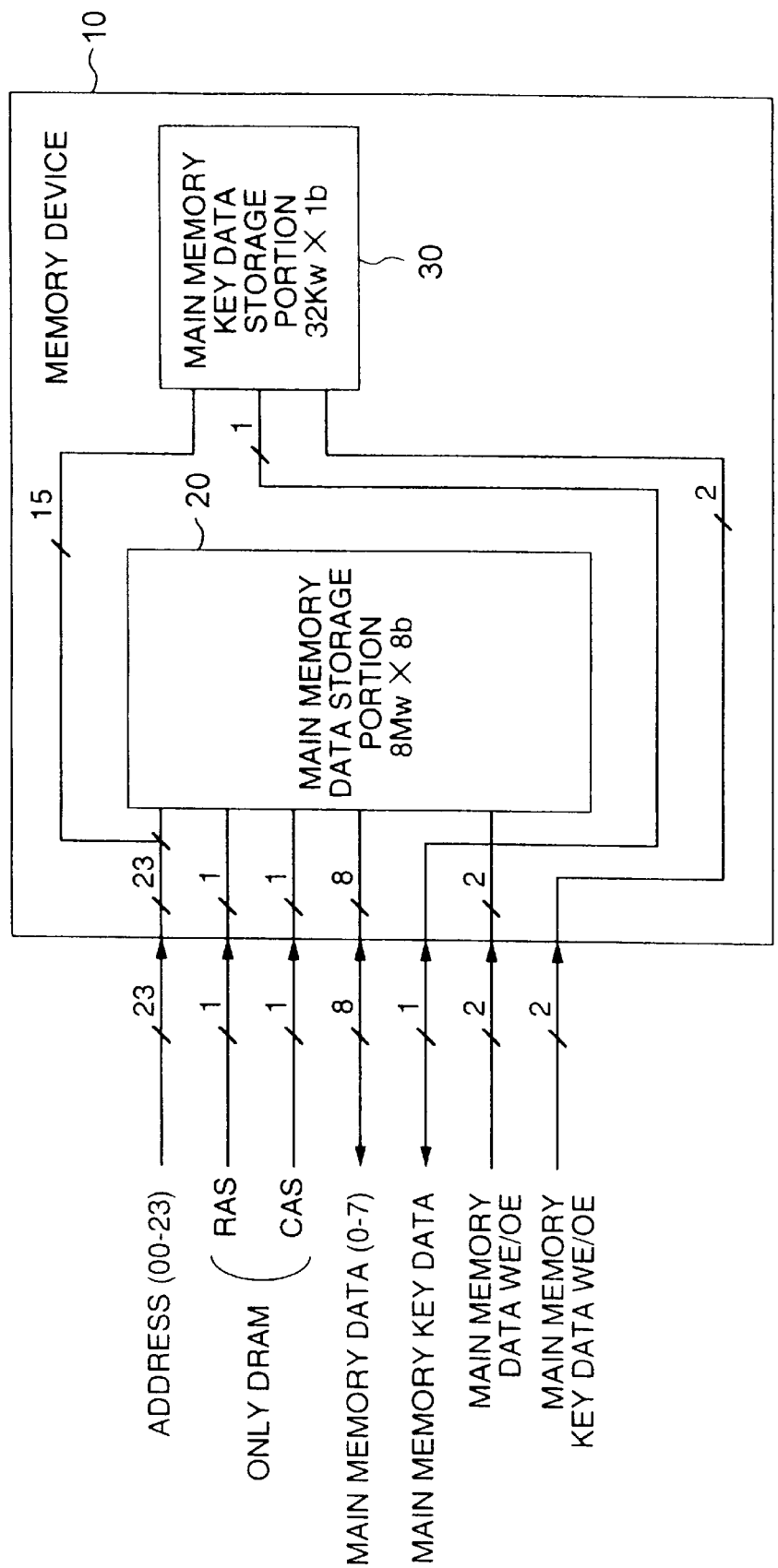
FIG. 1 is a block diagram schematically illustrating a data memory unit according to an embodiment of the present invention.
Figure 2:
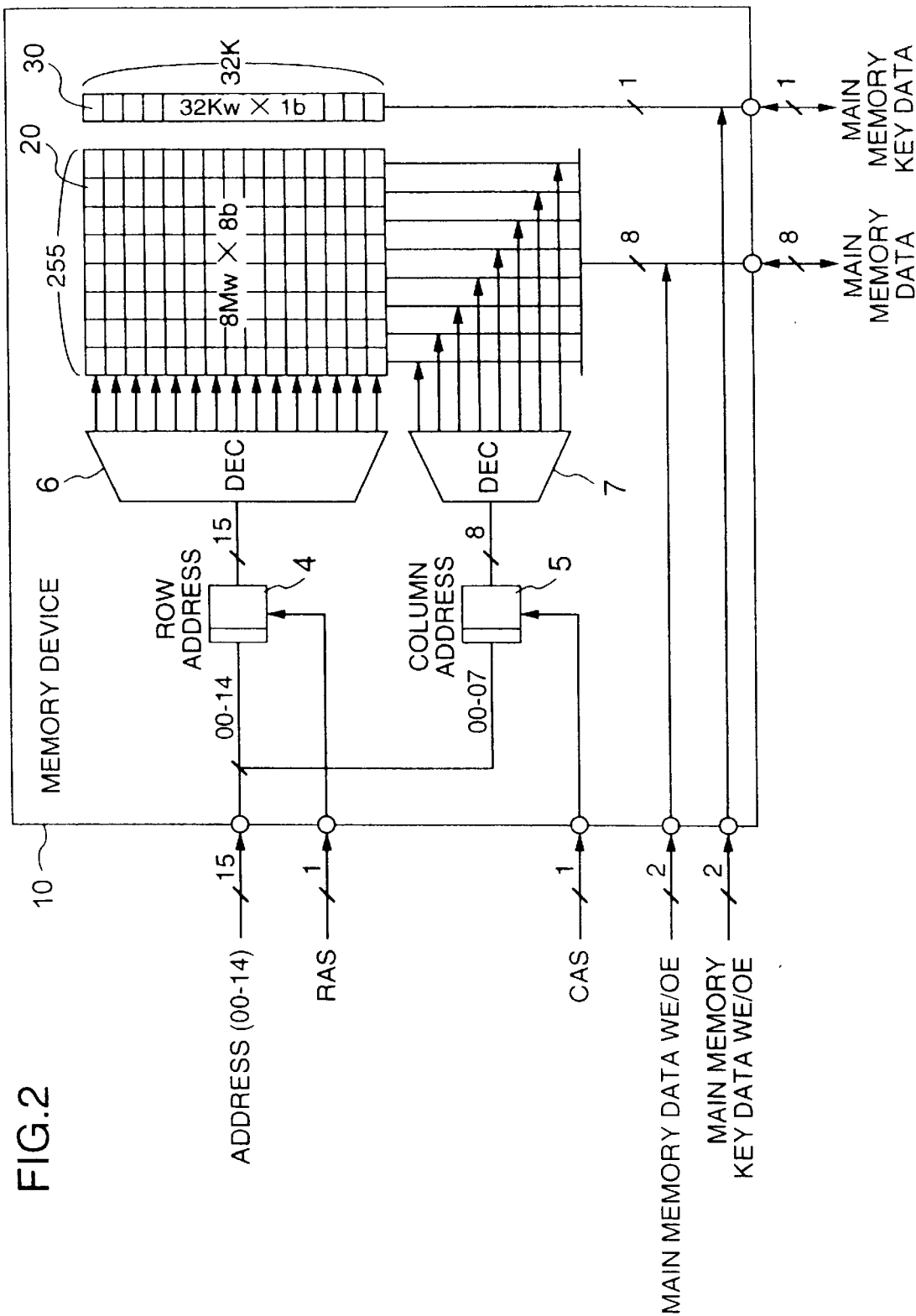
FIG. 2 is a block diagram schematically illustrating the data memory unit according to an embodiment of the present invention in detail.

FIG. 1 is a block diagram schematically illustrating a data memory unit according to an embodiment of the present invention. FIG. 2 is a block diagram illustrating the data memory unit in detail. FIGS. 3(a) and 3(b) are timing charts of the data memory units of the prior art and the present invention respectively. In FIGS. 1 and 2, numeral 10 denotes a data memory unit, 20 a main memory data storage portion, 30 a main memory key data storage portion, 4 a row address storage buffer, 5 a column address storage buffer, 6 a row address decoder, and 7 a column address decoder.

The data memory unit 10 according to this embodiment of the present invention includes, as shown in FIG. 1, a main memory data storage portion 20 and a main memory key data storage portion 30 as data storage portions, which are integrated in the same semiconductor chip. The data memory unit is an example of a memory unit used when a data storage apparatus having main memory keys of 16 bits per one page (4 K bytes) of the main memory is structured. In this example, the main memory data storage portion 20 has the memory capacity of 8 M bytes (8 Mw×8 bits) and the main memory key data storage portion 30 has the memory capacity of 32 K bits (32 Kw×1 bit).

Further, the data memory unit 10 includes, as shown in FIG. 2 in detail, the row address storage buffer 4, the column address storage buffer 5, the row address decoder 6 and the column address decoder 7 for the purpose of accessing data storage portions 20 and 30. The main memory data storage portion 20 can be accessed by the row and column addresses and the main memory key data storage portion 30 can be accessed by the row address.

In addition, the data memory unit 10 includes, as main input/output pins, 23 address input pins (12 to 23 pins for DRAM), one row address strobe and one column address strobe RAS/CAS input pins (for DRAM only), 8 main memory data (data referred by all bits of the address) input/output pins, one main memory key data (data referred by partial bits of the address) input/output pin, one main memory data write enable and one main memory data output enable WE/OE pins, and one main memory key data write enable and one main memory key data output enable WE/OE pins.

In the embodiment of the present invention, an address signal of 23 bits (8 M) is applied to the storage portions as an address for the main memory data, while upper 15 bits thereof are first applied thereto as a row address to thereby select one row of 32 K rows and lower 8 bits are then applied as a column address to thereby select one column of 256 columns, so that a main memory data to be referred is designated. In this case, the address for reference to the main memory key data corresponds to the upper 15 bits of the address of 23 bits for reference to the main memory data, that is, a row address (FIG. 1) and the main memory key data to be referred can be designated without a column address.

In the embodiment of the present invention as structured above, the main memory key data can be accessed at a higher speed than the main memory data. Further, the reference to the main memory data of 8 bits (1 byte) and the main memory key data of one bit can be made by the single access. Furthermore, since the separate WE/OE signals are provided for the main memory data and the main memory key data, only one of the main memory data and the main memory key data can be accessed.

The timing chart of FIGS. 3(a) and 3(b), explaining operation of the data memory unit, show an example of a process in which the main memory key data is referred and after a protection key is examined, the main memory data and the main memory key data are stored or updated. The timing chart of FIG. 3(a) shows a prior art and the timing chart of FIG. 3(b) shows the embodiment of the present invention.

In the case of the prior art shown in FIG. 3(a), a row address and a column address are inputted successively to obtain main memory key data as read data and a row address and a column address are then inputted again successively to input main memory data and main memory key data as write data. In this manner, the prior art requires inputting of row addresses and column addresses twice.

In the embodiment of the present invention shown in FIG. 3(b), since main memory key data can be obtained as read data by inputting of a row address, main memory data and main memory key data are inputted as write data subsequently and a column address continuing to the row address is inputted to thereby store or update main memory data and main memory key data. In this manner, in the embodiment of the present invention, only one inputting of the row address and the column address can make reference to the main memory key data and after the protection key is examined, the main memory data and the main memory key data can be stored or updated.

More particularly, according to the embodiment of the present invention, since the protection key for main memory is read earlier than the main memory data to examine the protection key and the main memory data can be stored on the basis of the result of the examination, the process can be made at a high speed. In the example shown in FIGS. 3(a) and 3(b), the processing time in the embodiment of the present invention can be reduced to about two thirds of the prior art.

FIG. 4 is a block diagram illustrating a portion (named a memory block) of the data storage apparatus constituted by the memory units according to the embodiment of the present invention described above, and FIG. 5 is a block diagram illustrating an example of a circuit for updating the main memory data. In FIGS. 4 and 5, numeral 40 denotes a memory block, 41 a format showing but assignment of the main memory key data, and 42 an update circuit for main memory key data.

The memory block shown in FIG. 4 is composed of 18 memory units described with reference to FIGS. 1 and 2 and constitutes one block of the data storage apparatus including the main memory key data of 16 bits per 4 K bytes (one page) and ECC (error check and correction code) data of 2 bytes per 16 bytes of the main memory data. In this embodiment, both of the main memory data of 16 bytes and the main memory key data of 16 bits can be referred to by a single access and only one of them can be also referred. A key bit appendant to each of the ECC data of 2 bytes is not used as the main memory key data.

The main memory key data of 16 bits includes doubled portions each having 8 bits as shown by the format 41 thereof and the contents thereof are updated by the key data update circuit 42 included in the memory block 40. The main memory key data update circuit 42 includes 4 OR gates $OR_1$ to $OR_4$ and is supplied with the WE signal for the main memory key data, the main memory key data and the OE signal and the WE signal for the main memory data. When reference to the main memory data is made, an R bit (reference bit) of the main memory key data is updated at the same time and when update of the main memory data is made, a C bit (change bit) is updated at the same time.

FIG. 6 illustrates a configuration of the data storage apparatus according to an embodiment of the present invention and allocation of an address. In FIG. 6, numeral 50 denotes a data storage apparatus and other reference numerals are the same as those of FIG. 4.

The data storage apparatus shown in FIG. 6 is composed of 32 memory blocks each including 18 memory units described with reference to FIG. 4 and has the main memory capacity of 4 G bytes. The data storage apparatus includes the main memory key data of 16 bits per one page of the main memory and the ECC data of 2 bytes per 16 bytes of the main memory.

The address for reference to the main memory data in this case has 32 bits (4G) and is allocated to a block address of 5 bits from the upper bit, a row address of subsequent 15 bits, a column address of further subsequent 8 bits and an intrablock address (for designating one of 16 memory units except for the ECC in the block) of last 4 bits to thereby be able to make reference to the main memory data of 4 G bytes.

The embodiments of the present invention have been described by taking the memory unit having definite numerical values and structure as an example, while the numerical values and structure can be changed and the present invention can be realized as a memory unit or data storage apparatus modified in the scope of the technical idea of the present invention in accordance with a purpose of use.

As described above, according to the present invention, since the main memory data and the main memory key data are stored in the same data memory unit, the main memory key data storage portion can be also increased at the same time when the memory capacity of the main memory data storage portion is increased or expanded and accordingly the main memory can be increased easily. Further, according to the present invention, although the main memory data and the main memory key data are stored in the same data memory unit, reference to the main memory key data can be made at a higher speed than reference to the main memory data and accordingly the processing time can be reduced. Furthermore, according to the present invention, reference to the main memory data and update of the main memory key data appendant thereto can be made at the same time and accordingly the processing efficiency can be improved.

What is claimed is:

1. A data memory unit for accessing data designated by an address, the data memory unit comprising:

a main data storage portion for storing data, wherein the data is accessed by using all bits of a given address; and a reference data storage portion for storing reference data corresponding to data stored in the main data storage portion, wherein the reference data is accessed by using fewer than all bits of the given address;

wherein the given address includes a row address and a column address inputted successively at different timings and the reference data is accessed by using only the row address; and the data memory unit can easily be combined with a plurality of similar data memory units to form a memory block which is accessed in a manner similar to accessing of the data memory unit; and said memory block can be combined with a plurality of similar memory blocks to form a main memory which can be accessed in a manner similar to accessing of the memory block.

2. A data storage apparatus comprising a plurality of data memory units according to claim 1, wherein said reference data are information appendant to data stored in the main data storage portion, and the data storage apparatus further comprises a circuit for updating the reference data at the same time that data in the main data storage portion is accessed.

3. A memory device in which main memory data and main memory key data are stored in a single chip, the memory device comprising:

a main memory data storage portion which is accessed by all bits of an externally supplied address; and a main memory key data storage portion which is accessed by fewer than all bits of the externally supplied address;

wherein the externally supplied address includes a row address and a column address inputted in a time division manner and wherein the main memory key data storage portion is accessed by the row address; and wherein the memory device is easily extendible by being formed from a plurality of memory blocks, each of which is formed from a plurality of memory units, each of which having its own main memory data storage portion and main memory key data storage portion which are accessed in a manner similar to accessing of the memory device.

4. A memory device according to claim 3, wherein data stored in said main memory key data storage portion are information appendant to data stored in the main memory data storage portion, and the memory device further comprises a circuit for updating the data stored in the main memory key data storage portion at the same time that data in the main data storage portion is accessed.

* * * * *